Aug. 9, 1932. A. KÉGRESSE 1,871,180

TRAILING CARRIAGE FOR MOTOR CAR TRAILERS

Filed June 10, 1930 2 Sheets-Sheet 1

INVENTOR:
Adolphe Kégresse
BY
ATTORNEY

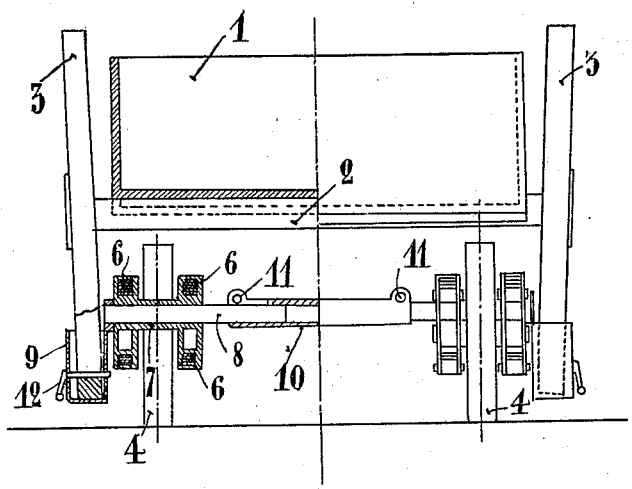

Patented Aug. 9, 1932

1,871,180

UNITED STATES PATENT OFFICE

ADOLPHE KÉGRESSE, OF COURBEVOIE, FRANCE

TRAILING CARRIAGE FOR MOTOR CAR TRAILERS

Application filed June 10, 1930, Serial No. 460,176, and in France June 12, 1929.

This invention has for its object improvements in and relating to trailing carriages for motor car trailers.

In the specification of my French Patent Nr. 643,913 of April 15th, 1927, and its duplicate U. S. Patent No. 1,746,082 of February 4, 1930, I have described a form of trailing carriage comprising two bogies fitted on an unsuspended trailer and through which said trailer may withstand the great speeds which could be imparted to the same by the dragging motor car.

Each bogie of the device thus described in said specification is independently arranged and connected to the trailer by a strut which is rigidly fastened to the axle of said trailer.

Such an assembly has several inconveniences:

1. It is not applicable to all trailers, for the arrangement of the axles varies with the type of the trailer. Therefore the trailing carriage to be fastened to the axle can be fitted only on the type for which it has been designed.

2. Through the absence of connection between both trailing carriages the device itself and its connection strut are liable to be subjected to detrimental torsions.

3. The spring device arranged on both sides of the wheels of the carriages and comprising a single laminated spring for each side, the ends of which are freely fastened on the wheel axle itself, does not offer a sufficient transversal stiffness, especially in the curves, and the wheels tend to set down.

The invention has for its object to remedy such heavy drawbacks without entailing a diminution of the quality of the proposed device.

In the appended drawings

Figure 3 an end view of the same.

Figure 1:
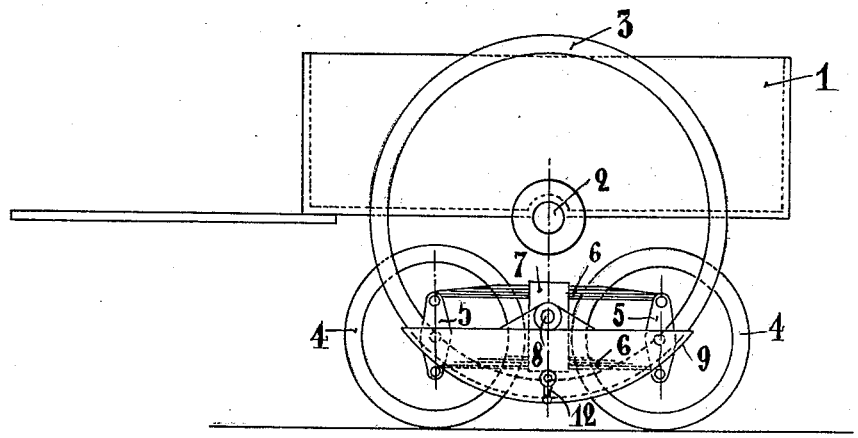
Figure 1 shows in elevation a trailer provided with the device according to the invention.
Figure 2:
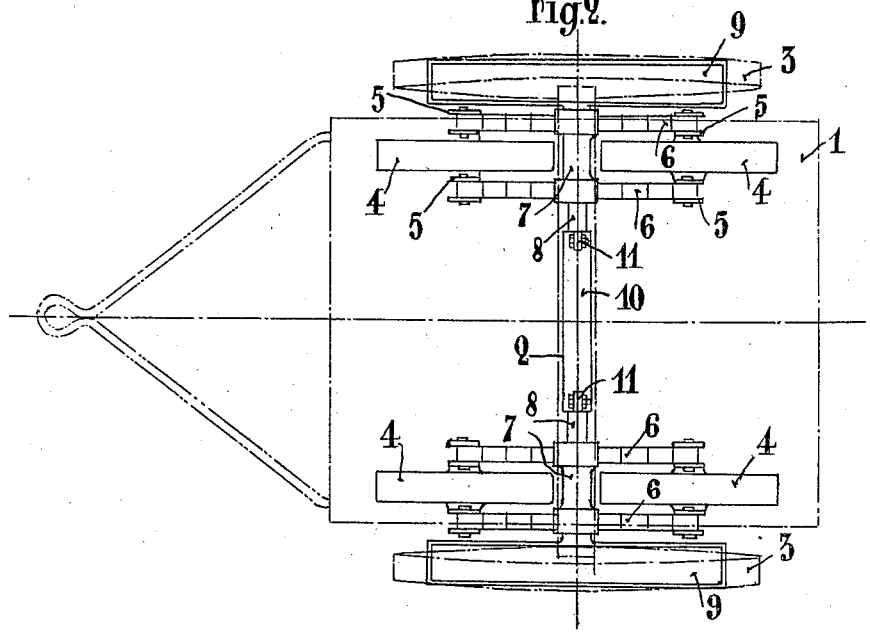
Figure 2 is a top view.

In all the figures the trailer is shown as a rectangular body 1 freely resting on an axle 2 the ends of which carry ordinary wheels 3 (Figures 1, 2 and 3).

Each pair of trailing wheels corresponding to each wheel of the trailer comprises two wheels 4 provided with rubber tires. The axle of said wheels carries on each end a lozenge-shaped vertically arranged flange 5 (Figure 1), the upper and lower ends of which are forked in their outer part. In this fork is fitted the articulated end of the suspension springs 6.

Each carriage therefore comprises four springs, two on the one side of the wheels and two on the other side of wheels 4, said springs being superposed and forming in this way an elastic parallelogram.

The four springs are rigidly fastened through their middle part on a common member 7 (Figures 1 and 2) carrying itself near its centre an axis 8 on which the whole of the carriage may swing.

The axis 8 projects outwardly from the common member 7 and carries a cradle 9 of a suitable form in which wheel 3 of the trailer is fixed for instance by means of a bolt 12 (Figures 1 and 2).

The height of the cradle over the ground is sufficient in order that the lower part of the same never bears on the ground in spite of the flexibility of the springs.

On the other end of axis 8 (Figure 3), that is on the end projecting inwardly from the common member 7, slides a tube 10 adapted to form the axle for the two bogies and carrying on each end a locking device 11.

As above described, it is to be seen that the above mentioned deficiencies of the known device are completely done away and set right in the following manner:

The first one through the tubular axle 10 which is slidably mounted on the inner ends of the axis 8, thus allowing of a variation of the distance between the bogies for adapting the same to the wheel track of the trailer;

The second one through the locking of said axle 10 on each end on the axes 8, thus ensuring a rigid connection between both carriages and thus avoiding detrimental torsions;

The third one through the arrangement of four springs for each bogie forming an articulated elastic parallelogram ensuring the transversal steadiness of the wheels especially in the curves.

What I claim is:

1. In combination with a non-suspended trailer comprising a trailer body, an axle supporting the body, and wheels mounted on the axle ends; a bogie for each wheel of the trailer, said bogie comprising two wheels in tandem, an axle for each wheel, and a plurality of springs connecting these axles to elastically support the bogie wheels in spaced relation; means on each bogie for supporting its trailer wheel clear of the ground; and means for varying the distance between the bogies in accordance with the distance between the trailer wheels.

2. The combination as set forth in claim 1, wherein the springs for each bogie comprise a spring on each side of the bogie wheel and a spring above and below the bogie axle, the bogie axle being elastically supported at the ends of the springs.

3. The combination as set forth in claim 1, wherein the means on each bogie for supporting its trailer wheel includes a cradle in which the bottom of the trailer wheel is adapted to rest, said cradle being elastically mounted on the bogie to permit relative movement of the bogie and its trailer wheel, and means for locking the trailer wheel in its position of rest to the cradle while permitting such movement.

In testimony whereof, I affix my signature.

ADOLPHE KÉGRESSE.